March 11, 1930.   C. W. WOODHEAD   1,750,450
OPERATING MECHANISM FOR GLARE SHIELDS
Filed March 14, 1929
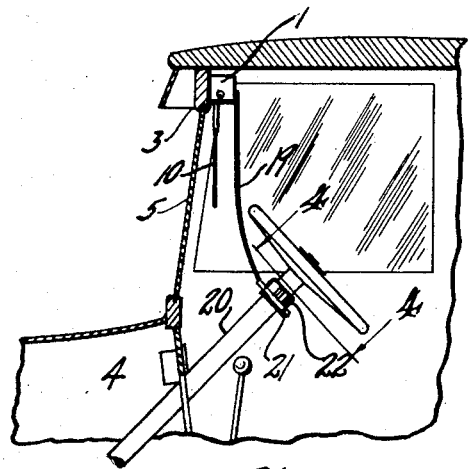
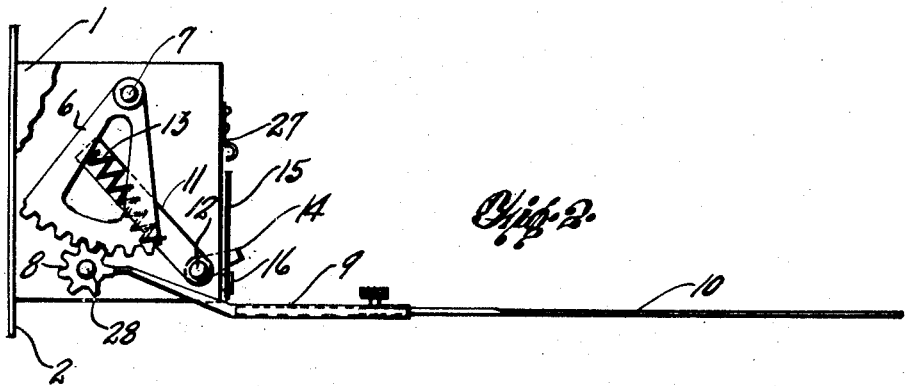
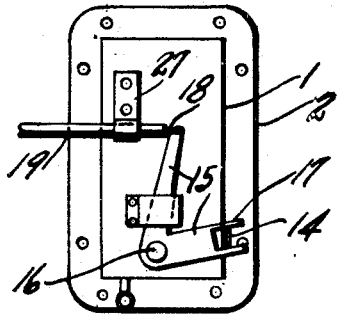
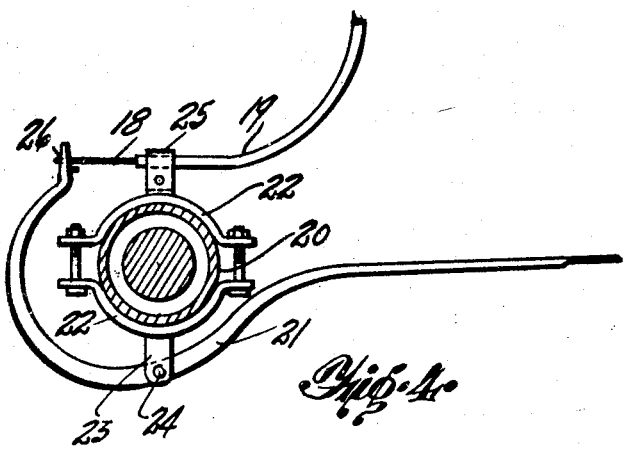
Inventor
Carl William Woodhead.
By Adam E. Fisher.
Attorney Patented Mar. 11, 1930

1,750,450

UNITED STATES PATENT OFFICE

CARL WILLIAM WOODHEAD, OF GILMAN, COLORADO

OPERATING MECHANISM FOR GLARE SHIELDS

Application filed March 14, 1929. Serial No. 346,914.

This invention is an operating mechanism for the glare shield of an automobile, and the object is to provide a relatively simple, efficient and practical device having an element extended to the hand of the operator at the steering wheel, for raising or lowering the glare shield, as desired.

In the drawing

Figure 1 is a side elevation of the device as attached in position upon an automobile, the latter being shown partly in section;

Figure 2 is an enlarged side elevation of the device, a portion of the housing being broken away to show the arrangement of the working elements within;

Figure 3 is an enlarged frontal view, considered as regarding the device from the driver's seat;

Figure 4 is an enlarged detail of the control elements attachable to the steering wheel post.

The invention comprises a suitable case or housing 1 having extended flanges 2 whereby it may be secured in place upon the frame 3 of an automobile 4 immediately over the windshield 5. A rack segment 6, pivoted at 7 in the upper part of the housing, meshes with a pinion 8 journaled upon a subshaft 28 inside of the case and from which is radially extended freely out through the case 1, the glare shield arm 9, carrying the adjustable glare shield 10. An elongated spring carrier 11 is mounted upon a shaft 12 journaled horizontally through the lower frontal portion of the case 1, from side to side, the free end of the said spring carrier being extended upwardly and backwardly through the case 1. A retractile coil spring 13 is stretched between the free end of the carrier 11 and the forward end of the segment 6. A lever 14 is secured to the outer extended end of the shaft 12 at the right hand side of the case 1, and a bell crank lever 15 is pivoted at 16 to the outer front face of the case 1, the lower arm of this lever being bifurcated as shown at 17 to embrace the end of the lever 14, as shown. An operating wire 18 is connected to the upper arm of the lever 15 and extends through a flexible tube 19 to a convenient point upon the steering post 20. The end of the wire 18 may be secured directly to the post 20, or if preferred, a curved hand lever 21 may be secured by clamps 22 to the post immediately below the steering wheel, one of the said clamps having spaced ears 23 between which the said lever 21 is pivotally mounted upon a pin 24, and the other of the said clamps 22 carrying a tube clamp 25 for engaging the tube 19. The wire 18 is then secured at 26 to the end of the lever 21. The end of the tube 19 adjacent the upper arm of the bell crank lever 15 is supported by the clamp 27 upon the face of the case 1.

By pulling or pushing directly upon the wire 18, or by manipulating the lever 21, the spring carrier 11 will swing so that the spring 13 will exert its pull from different angles upon the rack segment 6, causing the same to move or rotate in either direction as desired, and consequently swinging the shield 10 up out of the way or down across the line of vision of the driver, as desired.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a device of the kind described, a case for mounting above the windshield of an automobile, a rack segment pivoted in the upper part of the case, a pinion journaled in the case in mesh with the said rack, an arm extended from the said pinion outwardly through the case, a glare shield at the end of the arm, a shaft journaled horizontally and laterally through the lower frontal portion of the case, an elongated spring carrier mounted upon the said shaft within the case, the free end thereof being extended upwardly and backwardly, a retractile coil spring stretched between the free end of the spring carrier and the forward end of the said rack segment, a lever at the outer extended end of the spring carrier shaft, a bell crank lever pivoted upon the outer front face of the case, the end of one arm of this lever being bifurcated and thereby engaging the said lever at the end of the spring carrier shaft, and an operating wire extended from the other arm of the said bell crank lever to a point convenient to the hand of the driver.

In testimony whereof I affix my signature.

CARL WILLIAM WOODHEAD.